March 14, 1961 P. R. ARMSTRONG ET AL 2,975,310
ROTOR STRUCTURE FOR SYNCHRONOUS INDUCTION MOTORS
Filed June 3, 1957 2 Sheets-Sheet 1

INVENTORS.
PAUL R. ARMSTRONG,
FREDERICK O. LUENBERGER,
By Flam and Flam
ATTORNEYS.

Paul R. Armstrong,
Frederick O. Luenberger,
INVENTORS.

BY Flam and Flam
ATTORNEYS.

United States Patent Office 2,975,310
Patented Mar. 14, 1961

2,975,310

ROTOR STRUCTURE FOR SYNCHRONOUS INDUCTION MOTORS

Paul R. Armstrong, Anaheim, and Frederick O. Luenberger, Los Angeles, Calif., assignors to U.S. Electrical Motors, Inc., Los Angeles, Calif., a corporation of California Filed June 3, 1957, Ser. No. 663,133

4 Claims. (Cl. 310—163)

This invention relates to induction motors, and particularly to the rotor structures of such motors.

In the usual type of induction motor, the maximum speed attained is slightly below synchronism. The rotor in such motors is either of the wound or squirrel cage type. The magnetic core is so made as to provide substantially uniform magnetic reluctance for any path of the flux flowing between the stator and the rotor.

In the type with which this invention is primarily concerned, this uniformity is purposely avoided, so that definite or salient magnetic poles can be induced; and due to the phenomenon of reluctance of the magnetic path through the poles, the induction motor is caused to operate in a manner analogous to a salient pole synchronous motor.

It is one of the objects of this invention to improve and simplify the rotor structures for such reluctance motors.

The rotors for this type of motor are usually provided with symmetrically grouped conductors and slots, the groups corresponding in number to the number of poles of the rotor. It is another object of this invention to construct such rotor structures inexpensively.

This invention possesses many other advantages, and has other objects which may be made more clearly apparent from a consideration of one embodiment of the invention. For this purpose, there is shown a form in the drawings accompanying and forming a part of the present specification. This form will now be described in detail, illustrating the general principles of the invention; but it is to be understood that this detailed description is not to be taken in a limiting sense, since the scope of this invention is best defined by the appended claims.

Referring to the drawings.

Figure 1:
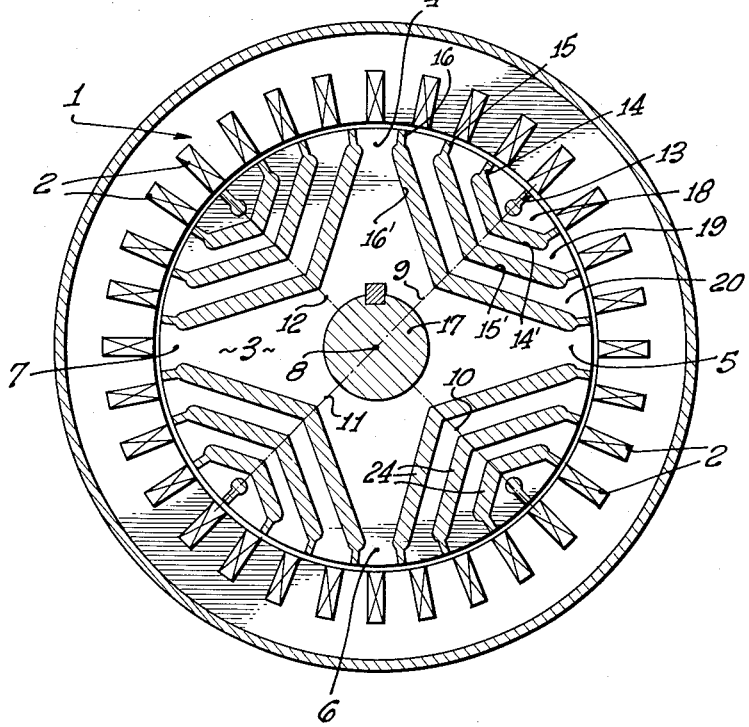
Figure 1 is a sectional view, mainly diagrammatic, of a motor incorporating the invention.
Figure 2:
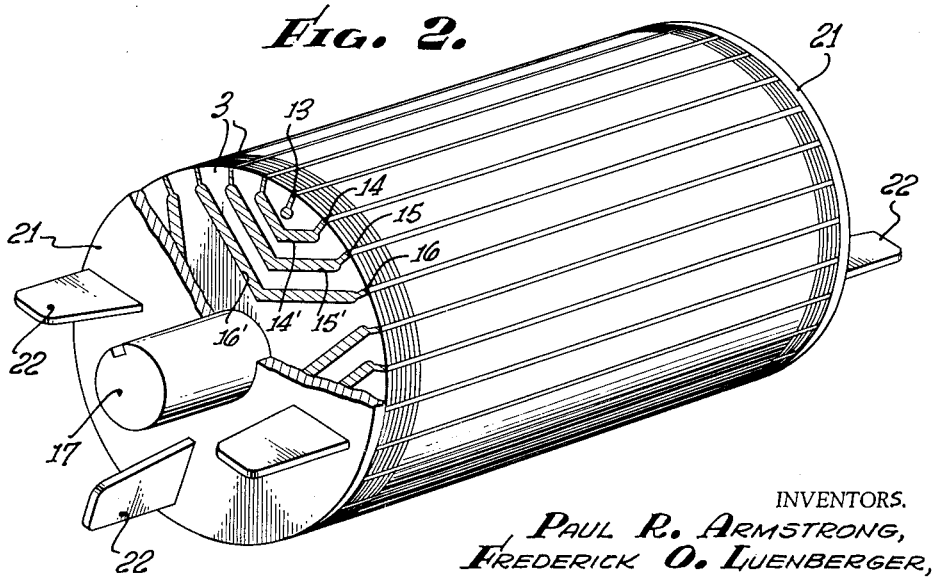
Fig. 2 is a pictorial view of a rotor partly broken away, and incorporating the invention.

In Fig. 1 the stator 1 is shown as having an armature winding including coils disposed in slots 2 in the stator. The rotor structure includes laminations 3 (see also Fig. 2). These laminations are so formed as to define salient poles 4, 5, 6 and 7, equiangularly spaced about the axis 8 of the rotor. These salient poles are separated by groups of slots. Since the groups are identical, it is necessary to describe but one of them.

Each group of slots is symmetrically disposed about a radial line 9, 10, 11 or 12. These radial lines are disposed intermediate the salient poles. In the present instance, there is a central slot 13 having an enlarged inner portion and falling on the line 9. On each side of this central slot, are symmetrically disposed pairs of slots 14, 15, 16. The pair 14 is joined by symmetrical slanting portions 14', joining at an apex falling on line 9. The pair 15 is similarly joined by the deeper portion 15' paralleling portions 14'; and finally, the pair 16 is joined by the still deeper portions 16', parallel to portions 14' and 15'.

The deepest slanting portions 16' of the slots 16 define the outline of the salient poles. Thus, each pole 4, 5, 6 or 7 has a relatively narrow portion near the periphery and a relatively wide portion adjacent the rotor shaft 17.

The lamination 3 thus has completely isolated segmental portions between the series of slots in any group. These portions are represented by elements 18, 19 and 20.

All of the slots 14, 15, 16 and their extensions 14', 15' and 16' are filled with conducting bars 24 to form a squirrel cage winding.

When the rotor bars are cast, the end conducting rings 21 (Fig. 2) are cast integrally with the conductors 24 in the slots 14, 15 and 16. They serve to maintain these portions 18, 19 and 20 against removal, since they are confined by these cast bars. These end rings 21 may be provided if desired with fan blades 22 in a well understood manner.

Due to the reluctance of the magnetic salient poles 4, 5, 6 and 7, an induction motor constructed in accordance with this invention will run at synchronous speed during normal operation. The number of salient poles formed can correspond to the number of poles of the induction motor.

The flux passing from the stator 1 through the rotor 2 and back to the stator 1 is caused to follow the path defined by the salient poles 4 and the portions 18, 19 and 20 rather than paths transverse to the slots. Accordingly, the rotor operates in a manner somewhat analogous to a definite pole rotor.

Figure 3:
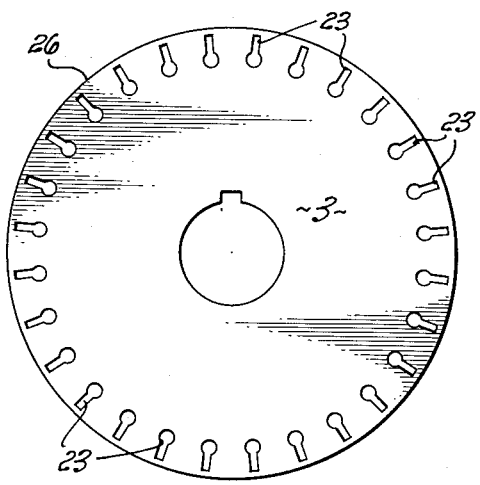
Fig. 3 is a view of a lamination which may be modified in accordance with this invention to aid in forming the magnetic core of the rotor.

Fig. 3 illustrates a standard form of lamination punching before it has been modified to comply with the requirements of the invention. In the lamination, uniformly spaced slots 23 are shown adjacent the periphery of the laminations. The slots are closed.

Figure 4:
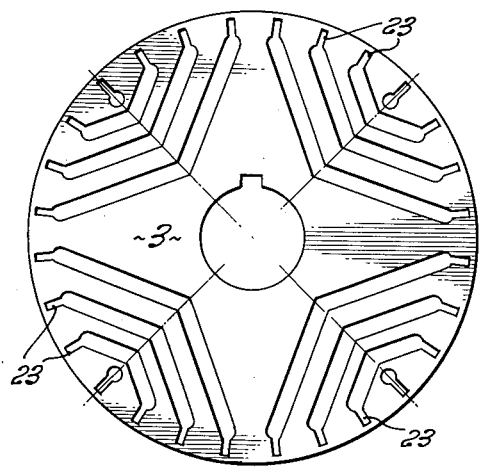
Fig. 4 is a view similar to Fig. 3, illustrating the lamination of Fig. 3 modified to comply with the invention.

The next step in the formation of the laminations is to stamp out the slots so that they correspond to what is shown in Fig. 4. Here there are four groups of symmetrically arranged lots disposed as already described in connection with Fig. 1. In view of the fact that the slots 23 are closed by the outer periphery of the laminations, this lamination forms a single piece.

Figure 5:
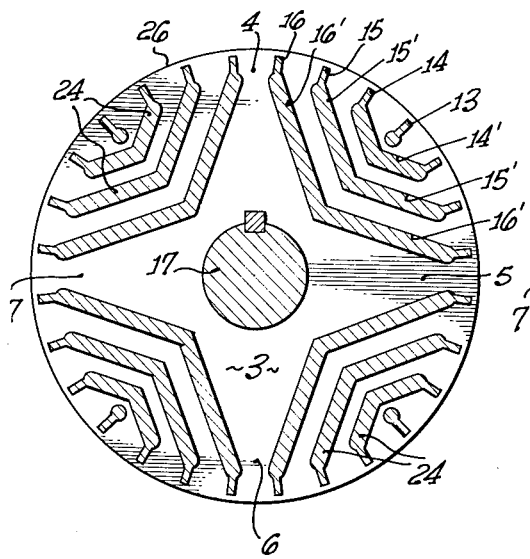
Fig. 5 is a cross-sectional view, illustrating the condition of the rotor after the conductors have been cast in the slot.
Figure 6:
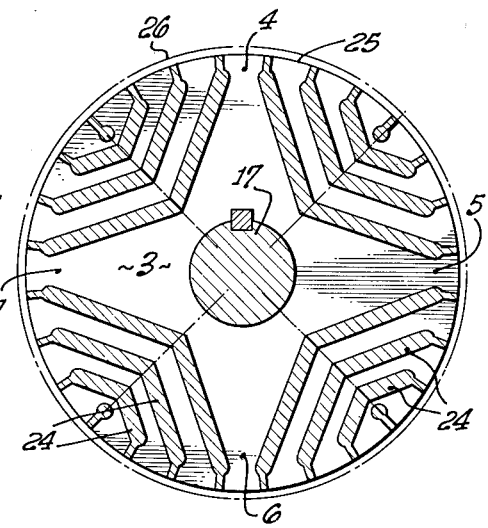
Fig. 6 is a view similar to Fig. 5 showing the completed rotor.

The laminations may then be assembled upon the shaft 17, as shown in Fig. 5, and can then be cast integrally with the end rings 21. The conductors 24 are indicated in section in Fig. 5, and they may be made of aluminum. These conductors may be cast centrifugally. The outer periphery of the laminations 3 can be turned down, as by a lathe, to correspond to a peripheral circumference 25 indicated in Fig. 6. This corresponds to the outer diameter of the finished rotor. The phantom line 26 corresponds to the outer periphery of the laminations 3 before the turning operation.

The inventors claim:

1. A rotor core lamination for an induction motor, having a series of radially extending portions forming salient poles, equiangularly spaced about the axis of the lamination, and groups of non-radial nested V-shaped slots defining said portions, the slots being progressively deeper as they approach said portions, and opening in the periphery of the lamination.

2. A rotor core lamination for an induction motor, having a series of radially extending portions forming salient poles, equiangularly spaced about the axis of the lamination, and groups of non-radial nested V-shaped slots defining said portions, the slots being progressively deeper as they approach said portions, and each group being symmetrical about a radial line intermediate the said portions, and opening in the periphery of the lamination.

3. In a rotor structure for an induction motor: a core having peripheral non-radial nested V-shaped slots arranged in groups to define a series of radially extending rotor portions, said portions being equiangularly spaced about the axis of the rotor; said slots opening in the periphery of the core; the slots being progressively deeper as they approach said portions; conductors in said slots; and end rings connecting all of the conductors in parallel; each group of slots being symmetrically disposed about a radial line intermediate said portions, the symmetrically arranged pairs being connected.

4. In a salient pole rotor structure for an induction motor: a core having groups of uniform non-radial nested V-shaped slots opening in the periphery of the rotor; there being as many groups of slots as there are poles; each group of slots having peripheral openings symmetrically disposed about a radius of the rotor and intermediate the poles; the outer pair of openings in each group being joined by slot portions extending inwardly to outline the poles; there being other slot portions in each group joining the similar pairs of peripheral openings that are symmetrical to the radius; the portion joining any pair of symmetrical openings having two symmetrical parts inclined to the radius and joining at the radius, the inclination being such that each pole formed by the outer slots widens toward the rotor axis.

References Cited in the file of this patent

UNITED STATES PATENTS

| | | |
|---|---|---|
| 1,551,271 | Slepian | Aug. 25, 1925 |
| 1,925,052 | Larsh | Aug. 29, 1933 |
| 2,733,362 | Bauer et al. | Jan. 31, 1956 |
| 2,769,108 | Risch | Oct. 30, 1956 |
| 2,913,607 | Douglas et al. | Nov. 17, 1959 |

FOREIGN PATENTS

| | | |
|---|---|---|
| 871,183 | Germany | Apr. 27, 1953 |